US012112872B2

(12) United States Patent
Hiraki et al.

(10) Patent No.: US 12,112,872 B2
(45) Date of Patent: Oct. 8, 2024

(54) COIL COMPONENT

(71) Applicant: Murata Manufacturing Co., Ltd., Kyoto-fu (JP)

(72) Inventors: Makoto Hiraki, Nagaokakyo (JP); Katsuhisa Imada, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 806 days.

(21) Appl. No.: 17/184,370

(22) Filed: Feb. 24, 2021

(65) Prior Publication Data

US 2021/0272733 A1 Sep. 2, 2021

(30) Foreign Application Priority Data

Feb. 27, 2020 (JP) ................................ 2020-031959

(51) Int. Cl.

| | |
|---|---|
| ***H01F 5/00*** | (2006.01) |
| ***H01F 17/00*** | (2006.01) |
| ***H01F 27/28*** | (2006.01) |
| ***H01F 27/29*** | (2006.01) |
| ***H01F 27/32*** | (2006.01) |

(52) U.S. Cl.

CPC ..... *H01F 17/0013* (2013.01); *H01F 27/2804* (2013.01); *H01F 27/292* (2013.01); *H01F 27/324* (2013.01)

(58) Field of Classification Search

CPC .................................................. H01F 27/2804
USPC .......................................................... 336/200
See application file for complete search history.

(56) References Cited

U.S. PATENT DOCUMENTS

2004/0084131 A1* 5/2004 Konoue ................ H01F 41/046 156/89.12
2018/0374636 A1* 12/2018 Itani ........................ H01F 27/24

FOREIGN PATENT DOCUMENTS

| | | |
|---|---|---|
| JP | 2004-079994 A | 3/2004 |
| JP | 2016-018926 A | 2/2016 |
| JP | 2017-059749 A | 3/2017 |
| WO | 2013/054587 A1 | 4/2013 |

* cited by examiner

*Primary Examiner* — Ronald Hinson
(74) *Attorney, Agent, or Firm* — Studebaker & Brackett PC

(57) ABSTRACT

A coil component in which stress inside thereof is alleviated and the DC resistance is low. A multilayer coil component includes an element body that includes an insulator portion and a coil embedded in the insulator portion; and outer electrodes disposed on surfaces of the insulator portion and electrically connected to ends of the coil. There is a groove-shaped void portion at a boundary between the coil and the insulator portion, and the void portion extends in a length direction of the coil. The coil has a ridge in the void portion, and the ridge extends in the length direction of the coil.

8 Claims, 7 Drawing Sheets

COIL COMPONENT

CROSS-REFERENCE TO RELATED APPLICATION

This application claims benefit of priority to Japanese Patent Application No. 2020-031959, filed Feb. 27, 2020, the entire content of which is incorporated herein by reference.

BACKGROUND

Technical Field

The present disclosure relates to a coil component.

Background Art

In coil components, in particular, multilayer coil components, stress occurs between an insulating portion of an element body and a coil, and due to the stress, electrical characteristics of the multilayer coil components vary. Thus, it is desirable to alleviate this stress.

Japanese Unexamined Patent Application Publication No. 2017-59749 describes that in order to alleviate the stress, a stress-alleviating space that contains a powder is disposed so as to be in contact with a lower surface of a coil conductor.

However, the coil component described in Japanese Unexamined Patent Application Publication No. 2017-59749 has an issue that, due to the presence of the stress-alleviating space across the entire lower surface of the coil conductor, the cross-sectional area of the coil conductor is decreased, and the DC resistance is increased.

SUMMARY

The present disclosure provides a coil component in which the stress inside the coil component is alleviated, and the DC resistance is low.

The present disclosure include the following embodiments.

A multilayer coil component that includes an element body that includes an insulator portion and a coil embedded in the insulator portion; and outer electrodes disposed on surfaces of the insulator portion and electrically connected to ends of the coil, in which there is a groove-shaped void portion at a boundary between the coil and the insulator portion, the void portion extending in a length direction of the coil, and the coil has a ridge in the void portion, the ridge extending in the length direction of the coil.

In the multilayer coil component described in [1], the void portion may have a width of 80% or less of a width of a coil conductor.

In the multilayer coil component described in [1] of [2], the ridge may have a width of 10 μm or more and 100 μm or less (i.e., from 10 μm to 100 μm).

The present disclosure can provide a coil component in which the stress inside the coil component is alleviated, and the DC resistance is low.

Other features, elements, characteristics and advantages of the present disclosure will become more apparent from the following detailed description of preferred embodiments of the present disclosure with reference to the attached drawings.

DETAILED DESCRIPTION

Figure 1:
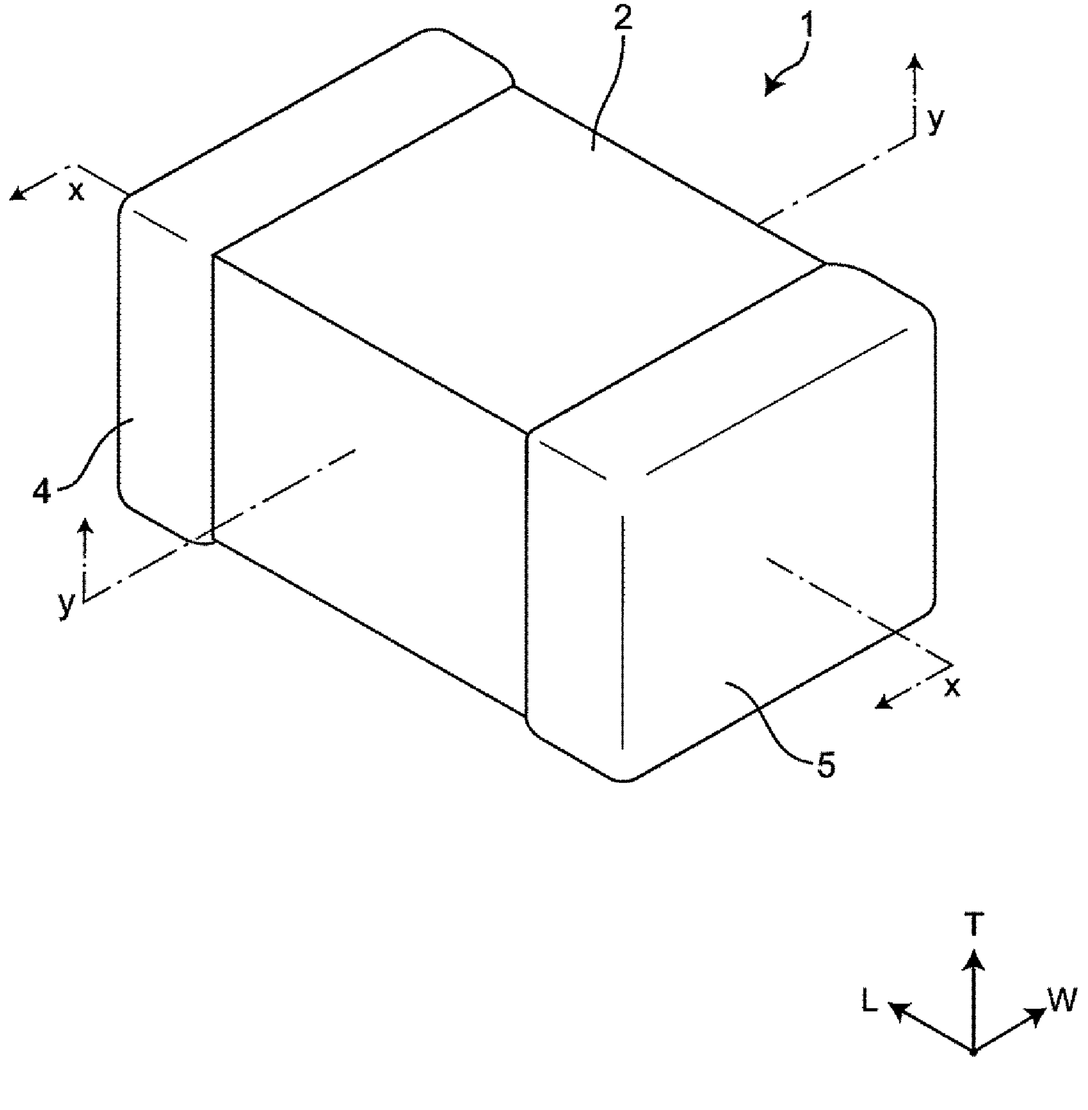
FIG. 1 is a schematic perspective view of a multilayer coil component of the present disclosure.

A multilayer coil component 1 according to one embodiment of the present disclosure will now be described in detail by referring to the drawings. The shape, arrangement, and other features of the multilayer coil component of this embodiment and respective constituent elements thereof are not limited by the examples illustrated in the drawings.

Figure 2:
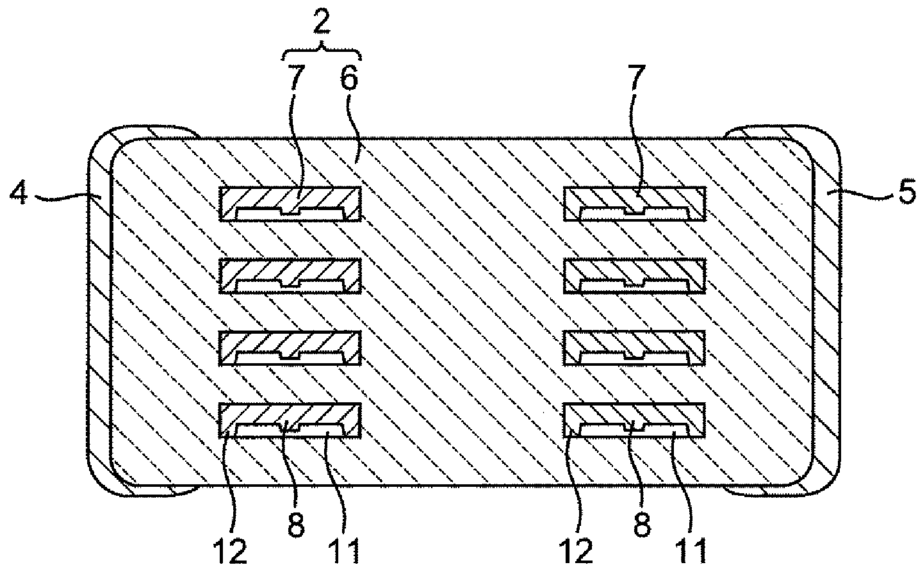
FIG. 2 is a cross-sectional view of the multilayer coil component illustrated in FIG. 1 taken along line x-x.
Figure 3:
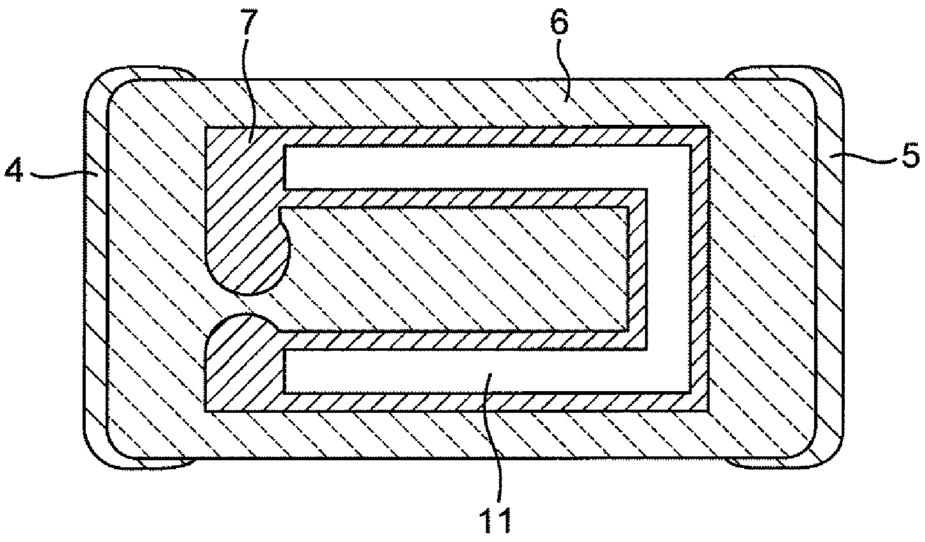
FIG. 3 is a cross-sectional view of the multilayer coil component illustrated in FIG. 1 taken along line y-y.

FIG. 1 is a perspective view of a multilayer coil component 1 of this embodiment, FIG. 2 is a cross-sectional view taken along line x-x, and FIG. 3 is a cross-sectional view taken along line y-y. However, the shape, arrangement, and other features of the multilayer coil component of this embodiment and respective constituent elements thereof described below are not limited by the examples illustrated in the drawings.

As illustrated in FIGS. 1, 2, and 3, the multilayer coil component 1 of this embodiment has a substantially rectangular parallelepiped shape. In the multilayer coil component 1, surfaces perpendicular to an L axis in FIG. 1 are referred to as "end surfaces", surfaces perpendicular to a W axis are referred to as "side surfaces", and surfaces perpendicular to a T axis are referred to as "upper and lower surfaces". The multilayer coil component 1 schematically includes an element body 2 and outer electrodes 4 and 5 respectively disposed on two end surfaces of the element body 2. The element body 2 includes an insulator portion 6 and a coil 7 embedded in the insulator portion 6. The coil 7 has a winding portion and two extended portions respectively at two ends of the winding portion, and is connected to the outer electrodes 4 and 5 via these extended portions. A groove-shaped void portion 11 that extends in the coil length direction is present at the boundary between one of the main surfaces (in FIG. 2, the lower main surface) of the coil 7 and the insulator portion 6. This void portion 11 can suppress occurrence of stress between the coil 7 and the insulator portion 6. In addition, the coil 7 has a ridge 8 that projects toward the inside of the groove serving as a void portion and wall portions 12 on both sides of the groove; thus, the cross-sectional area of the coil increases by the areas of the ridge and the wall portions, and thus the DC resistance is decreased.

As described above, the element body 2 of the multilayer coil component 1 of this embodiment includes the insulator portion 6 and the coil 7.

The insulator portion 6 is preferably formed of a magnetic body and is more preferably formed of sintered ferrite. The sintered ferrite contains, as main components, at least Fe, Ni, and Zn. The sintered ferrite may further contain Cu.

In one embodiment, the sintered ferrite contains, as main components, at least Fe, Ni, Zn, and Cu.

In the sintered ferrite described above, the Fe content based on $Fe_2O_3$ is preferably about 40.0 mol % or more and about 49.5 mol % or less (i.e., from about 40.0 mol % to about 49.5 mol %) (with reference to the total of main components, the same applies hereinafter), and is more preferably about 45.0 mol % or more and about 49.5 mol % or less (i.e., from about 45.0 mol % to about 49.5 mol %).

In the sintered ferrite described above, the Zn content based on ZnO is preferably about 5.0 mol % or more and about 35.0 mol % or less (i.e., from about 5.0 mol % to about 35.0 mol %) (with reference to the total of main components, the same applies hereinafter), and is more preferably about 10.0 mol % or more and about 30.0 mol % or less (i.e., from about 10.0 mol % to about 30.0 mol %).

In the sintered ferrite described above, the Cu content based on CuO is preferably about 4.0 mol % or more and about 12.0 mol % or less (i.e., from about 4.0 mol % to about 12.0 mol %) (with reference to the total of main components, the same applies hereinafter), and is more preferably about 7.0 mol % or more and about 10.0 mol % or less (i.e., from about 7.0 mol % to about 10.0 mol %).

The Ni content in the sintered ferrite described above is not particularly limited, and may be the balance of the aforementioned other main components, Fe, Zn, and Cu.

In one embodiment, the sintered ferrite contains about 40.0 mol % or more and about 49.5 mol % or less (i.e., from about 40.0 mol % to about 49.5 mol %) of Fe based on $Fe_2O_3$, about 5.0 mol % or more and about 35.0 mol % or less (i.e., from about 5.0 mol % to about 35.0 mol %) of Zn based on ZnO, about 4.0 mol % or more and about 12.0 mol % or less of Cu (i.e., from about 4.0 mol % to about 12.0 mol %) based on CuO, and the balance being NiO.

In the present disclosure, the sintered ferrite may further contain additive components. Examples of the additive components for the sintered ferrite include, but are not limited to, Mn, Co, Sn, Bi, and Si. The Mn, Co, Sn, Bi, and Si contents (added amounts) respectively based on $Mn_3O_4$, $Co_3O_4$, $SnO_2$, $Bi_2O_3$, and $SiO_2$ with respect to a total of 100 parts by weight of the main components (Fe (based on $Fe_2O_3$), Zn (based on ZnO), Cu (based on CuO), and Ni (based on NiO)) are each preferably about 0.1 parts by weight or more and about 1 part by weight or less (i.e., from about 0.1 parts by weight to about 1 part by weight). The sintered ferrite may further contain impurities that are unavoidable during the production.

The sintered ferrite may further contain, for example, Mn, Co, Sn, Bi, Si, and the like as additive components. Examples of the additive components for the sintered ferrite include, but are not limited to, Mn, Co, Sn, Bi, and Si. The Mn, Co, Sn, Bi, and Si contents (added amounts) respectively based on $Mn_3O_4$, $Co_3O_4$, $SnO_2$, $Bi_2O_3$, and $SiO_2$ with respect to a total of 100 parts by weight of the main components (Fe (based on $Fe_2O_3$), Zn (based on ZnO), Cu (based on CuO), and Ni (based on NiO)) are each preferably about 0.1 parts by weight or more and about 1 part by weight or less (i.e., from about 0.1 parts by weight to about 1 part by weight). The sintered ferrite may further contain impurities that are unavoidable during the production.

The coil 7 is constituted by coil patterns electrically connected to one another. The coil patterns are conductive layers that contain a conductive material. Preferably, the coil patterns are conductive layers that are substantially composed of a conductive material. The conducive material is not particularly limited, and examples thereof include Au, Ag, Cu, Pd, and Ni. The conductive material is preferably Ag or Cu, and is more preferably Ag. One conductive material or two or more conductive materials may be used.

The coil 7 has a ridge 8 that projects toward the inside of the groove-shaped void portion 11, and wall portions 12 that cover the void portion 11. The ridge 8 is formed at the center portion of the groove so as to be substantially parallel to the groove. The wall portions 12 surround the void portion 11. For example, in a cross section perpendicular to the coil length direction (for example, FIG. 2), the ridge 8 is formed at a substantially center portion of the coil conductor in the width direction so as to project downward from the coil conductor, and the wall portions 12 are formed at both ends of the coil conductor so as to flank the void portion 11. The shape of the ridge is not particularly limited, and can be, for example, rectangular, trapezoidal, or arc-like in a cross section perpendicular to the coil length direction.

The thickness of the conductor of the coil 7 is preferably about 30 μm or more and about 80 μm or less (i.e., from about 30 μm to about 80 μm) and more preferably about 40 μm or more and about 70 μm or less (i.e., from about 40 μm to about 70 μm). The thickness of the conductor of the coil refers to the thickness at a position where no void portion is present, typically, the thickness at the position of the wall portions 12. The DC resistance can be decreased when the thickness of the coil conductor is about 30 μm or more. The coil component can be made shorter in height and smaller in size when the thickness of the coil conductor is about 80 μm or less.

The width of the ridge 8 is preferably about 10 μm or more and about 100 μm or less (i.e., from about 10 μm to about 100 μm) and more preferably about 30 μm or more and about 60 μm or less (i.e., from about 30 μm to about 60 μm). When the width of the ridge 8 is within the aforementioned range, the internal stress can be effectively alleviated and the DC resistance can be decreased. Here, the width of the ridge refers to the width at a height about ½ of the height of the ridge in a cross section perpendicular to the coil length direction.

The width of the ridge 8 is preferably about 50% or more, more preferably about 70% or more, and yet more preferably about 80% or more of the width of the void portion 11. Increasing the width of the ridge 8 can decrease the DC resistance of the coil. Moreover, the width of the ridge 8 is preferably about 90% or less and more preferably about 85% or less of the width of the void portion 11.

The thickness of the ridge 8 may be appropriately adjusted according to the thickness of the void portion 11, but is preferably about 0.9 μm or more and about 29 μm or less (i.e., from about 0.9 μm to about 29 μm). Setting the thickness of the ridge to about 0.9 μm or more and about 29 μm or less (i.e., from about 0.9 μm to about 29 μm) can effectively alleviate the internal stress and decrease the DC resistance.

The thickness of the ridge 8 is preferably 50% or more, more preferably about 70% or more, and yet more preferably about 90% or more of the thickness of the void portion 11. Increasing the thickness of the ridge 8 can further decrease the DC resistance of the coil. Moreover, the thickness of the ridge 8 is preferably about 99% or less and more preferably about 95% or less of the thickness of the void portion 11.

The thickness of the wall portions 12 can be appropriately adjusted according to the thickness of the void portion 11, but is preferably about 0.9 μm or more and about 29 μm or less (i.e., from about 0.9 μm to about 29 μm). Setting the thickness of the wall portions to about 0.9 μm or more and about 29 μm or less (i.e., from about 0.9 μm to about 29 μm) can effectively alleviate the internal stress and decrease the DC resistance.

The void portion 11 is present at the boundary between the coil 7 and the insulator portion 6. The void portion 11 serves as what is known as a stress-alleviating space.

The void portion 11 is formed to have a groove shape along the length direction of the coil 7. Forming the void portion along the coil length direction can increase the cross-sectional area of the coil 7 by the areas of the ridge 8 and the wall portions 12 of the coil 7, and can decrease the DC resistance. In other words, forming the void portion along the direction in which the current flows can suppress the increase in DC resistance caused by the formation of the void portion.

Figure 4:
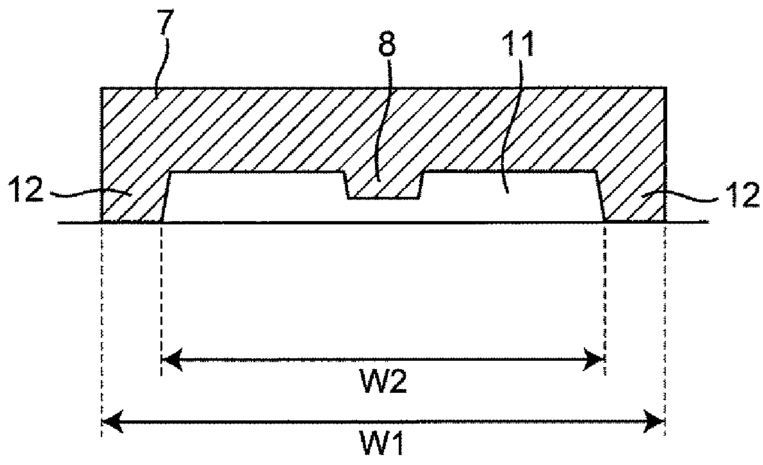
FIG. 4 is a cross-sectional view of a coil of the multilayer coil component 1 illustrated in FIG. 1.

Moreover, the width of the void portion (W2 in FIG. 4) is preferably about 95% or less and more preferably about 90% or less of the width of the coil pattern (W1 in FIG. 4). When the width of the void portion is about 95% or less of the width of the coil pattern, the width of the wall portions 12 on the outer side is increased, and the DC resistance can be further decreased. In addition, increasing the width of the wall portions 12 on the outer side can suppress delamination between the coil 7 and the insulator portion 6. In FIG. 4 etc., the cross section of the coil conductor has angular corners; however, the corners of the coil conductor of the present disclosure do not have to be angular and may be rounded.

The width W2 of the void portion is preferably about 40% or more, more preferably about 50% or more, and yet more preferably about 60% or more of the width W1 of the coil pattern. When the width of the void portion is about 40% or more of the width of the coil pattern, the internal stress can be more effectively alleviated.

The thickness of the void portion is preferably about 1 μm or more and about 30 μm or less (i.e., from about 1 μm to about 30 μm) and more preferably about 5 μm or more and about 15 μm or less (i.e., from about 5 μm to about 15 μm). Setting the thickness of the void portion to about 1 μm or more can more effectively alleviate the internal stress. Setting the thickness of the void portion to about 30 μm or less is advantageous in reducing the height and can further decrease the coil DC resistance. The thickness of the void portion refers to the thickness of a portion where the ridge 8 is absent.

The size of the void portion and the coil can be measured as follows.

A chip is polished with the LT surface of the chip facing an abrasive paper, and polishing is stopped at the substantially center portion of the element body. Subsequently, the chip is subjected to ion milling and observed with a microscope.

In the multilayer coil component 1 of the present disclosure, the outer electrodes 4 and 5 are disposed to cover the two end surfaces of the element body 2. The outer electrodes 4 and 5 are formed of a conductive material and are preferably formed of at least one metal material selected from Au, Ag, Pd, Ni, Sn, and Cu.

The outer electrodes may each be a single layer or may be multilayered. In one embodiment, each of the outer electrodes is multilayered and is preferably formed of two or more and four or less (i.e., from two to four) layers, for example, three layers.

In one embodiment, the outer electrodes are multilayered and can each include a Ag- or Pd-containing layer, a Ni-containing layer, or a Sn-containing layer. In a preferred embodiment, the outer electrodes each include a Ag- or Pd-containing layer, a Ni-containing layer, and a Sn-containing layer. Preferably, the aforementioned layers are arranged in the order of, from the coil conductor side, a Ag- or Pd-containing layer or preferably a Ag-containing layer, a Ni-containing layer, and a Sn-containing layer. Preferably, the Ag- or Pd-containing layer is a layer obtained by baking a Ag paste or Pd paste, and the Ni-containing layer and the Sn-containing layer can be plating layers.

The multilayer coil component 1 of the embodiment described above is produced as follows, for example. In this embodiment, an example in which the insulator portion 6 is formed from a ferrite material is described.

(1) Preparation of ferrite paste

First, a ferrite material is prepared. The ferrite material contains, as main components, Fe, Zn, and Ni, and, if desired, Cu. Typically, the main components of the ferrite material are practically oxides of Fe, Zn, Ni, and Cu (ideally, $Fe_2O_3$, ZnO, NiO, and CuO).

To prepare the ferrite material, $Fe_2O_3$, ZnO, CuO, NiO, and, if needed, additive components are weighed to obtain a particular composition, and then mixed and pulverized. The pulverized ferrite material is dried and calcined at, for example, a temperature of about 700° C. to about 800° ° C. so as to obtain a calcined powder. To this calcined powder, particular amounts of a solvent (ketone solvent or the like), a resin (polyvinyl acetal or the like), and a plasticizer (alkyd plasticizer or the like) are added, the resulting mixture is kneaded in a planetary mixer or the like, and the kneaded mixture is dispersed with a three-roll mill or the like to prepare a ferrite paste.

The Fe content (based on $Fe_2O_3$), the Mn content (based on $Mn_2O_3$), the Cu content (based on CuO), the Zn content (based on ZnO), and the Ni content (based on NiO) in the sintered ferrite may be considered to be substantially the same as the Fe content (based on $Fe_2O_3$), the Mn content (based on $Mn_2O_3$), the Cu content (based on CuO), the Zn content (based on ZnO), and the Ni content (based on NiO) in the ferrite material before firing.

(2) Preparation of conductive paste for coil conductor

First, a conductive material is prepared. Examples of the conductive material include Au, Ag, Cu, Pd, and Ni, of which Ag or Cu is preferable and Ag is more preferable. A particular amount of a powder of the conductive material is weighed and kneaded along with particular amounts of a solvent (such as eugenol), a resin (such as ethyl cellulose), and a dispersant in a planetary mixer or the like, and then the resulting mixture is dispersed in a three-roll mill or the like. As a result, a conductive paste for the coil conductor can be prepared.

(3) Preparation of resin paste

A resin paste for forming the void portion 11 in the multilayer coil component 1 is prepared. The resin paste can be prepared by adding, to a solvent (such as isophorone), a resin (such as an acrylic resin) that disappears when fired.

(4) Preparation of multilayer coil component (4-1) Preparation of element body

First, a substrate (not illustrated in the drawings) having a thermal release sheet and a polyethylene terephthalate (PET) film stacked on a metal plate is prepared. The ferrite paste is applied to the substrate by printing a particular number of times to form a ferrite paste layer 22 for an outer layer (FIGS. 5A and 5B).

Figure 5A:
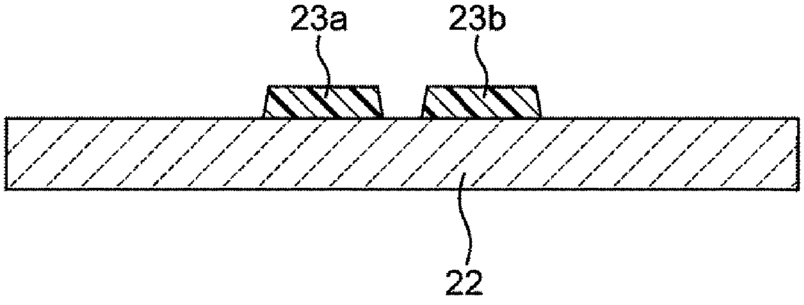
FIGS. 5A and 5B are diagrams illustrating a method for producing the multilayer coil component illustrated in FIG. 1 and are, respectively, a cross-sectional view and a top plan view including a coil part.
Figure 5B:
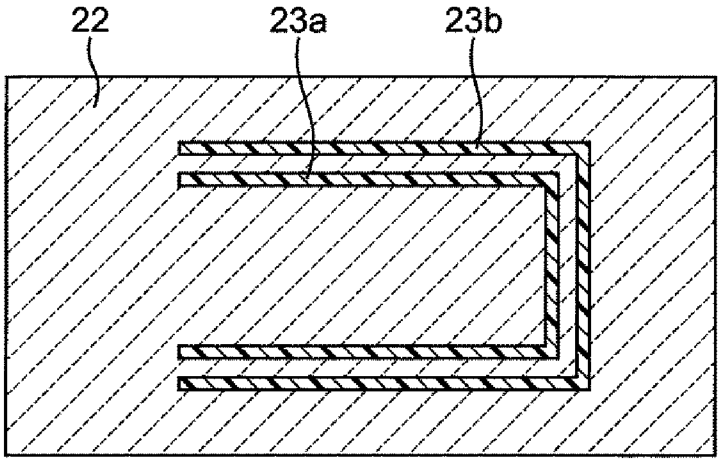

Next, the resin paste is applied by printing to a portion where the void portion 11 is to be formed so as to form resin paste layers 23*a* and 23*b* (FIGS. 5A and 5B).

Figure 6A:
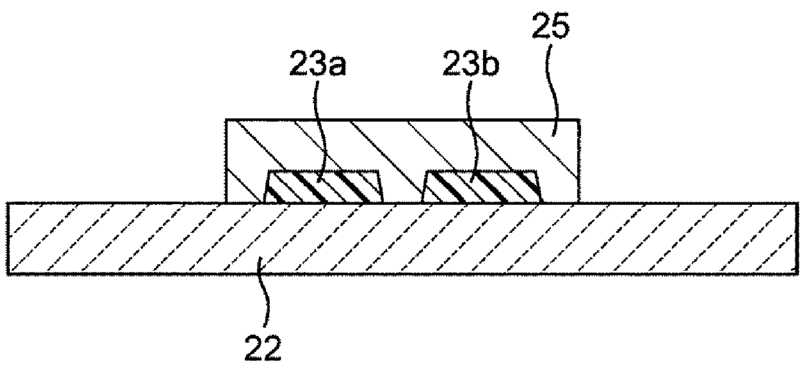
FIGS. 6A and 6B are diagrams illustrating the method for producing the multilayer coil component illustrated in FIG. 1 and are, respectively, a cross-sectional view and a top plan view including a coil part.
Figure 6B:
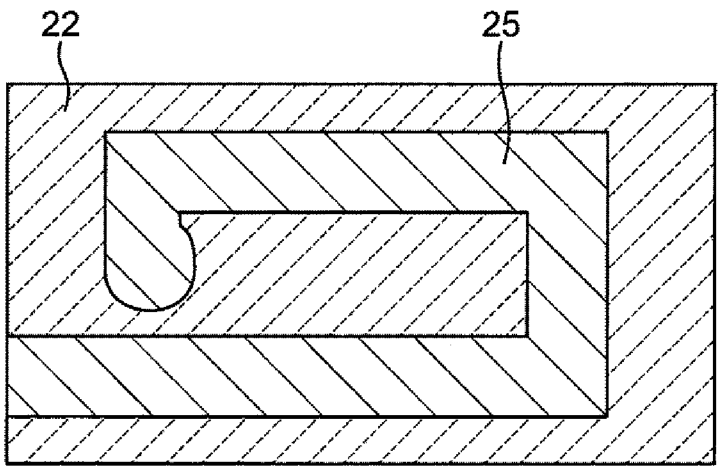

Next, the conductive paste is applied by printing to the entirety of the portion where the coil conductor is to be formed so as to form a first conductive paste layer 25 (FIGS. 6A and 6B).

Figure 7A:
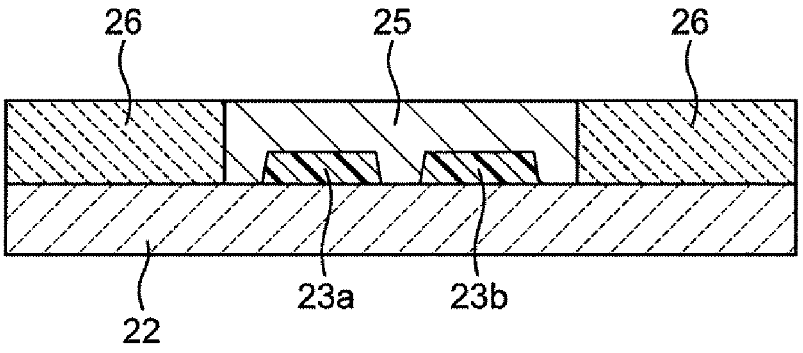
FIGS. 7A and 7B are diagrams illustrating the method for producing the multilayer coil component illustrated in FIG. 1 and are, respectively, a cross-sectional view and a top plan view including a coil part.
Figure 7B:
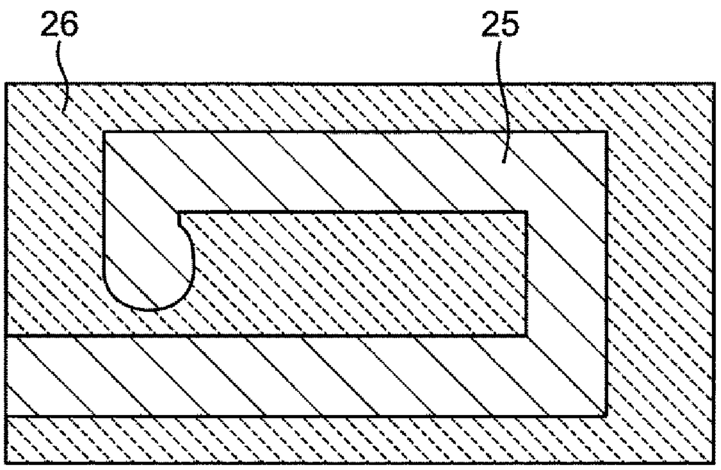

Next, the ferrite paste described above is applied by printing to the region where the conductive paste layer 25 is not formed so that the applied ferrite paste has the same height as the conductive paste layer, thereby forming a ferrite paste layer 26 (FIGS. 7A and 7B).

Figure 8A:
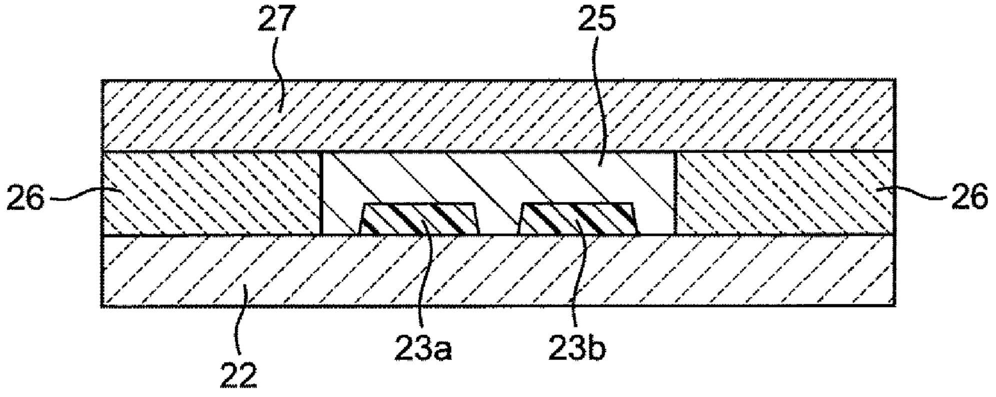
FIGS. 8A and 8B are diagrams illustrating the method for producing the multilayer coil component illustrated in FIG. 1 and are, respectively, a cross-sectional view and a top plan view including a coil part.
Figure 8B:
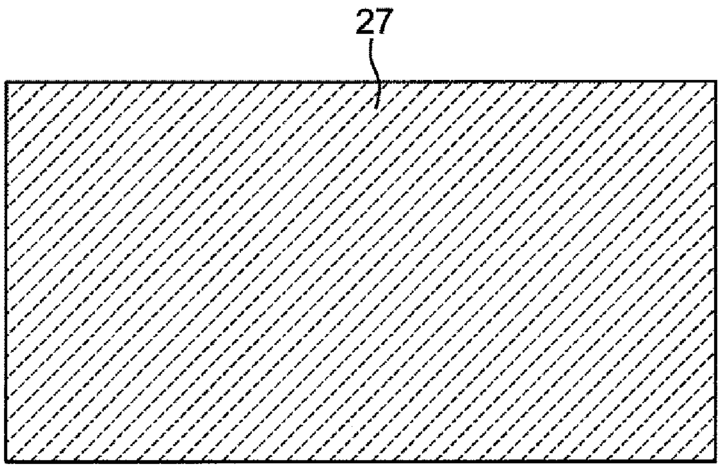

Next, the ferrite paste is applied by printing to the entire surface to form a ferrite paste layer 27 (FIGS. 8A and 8B).

Next, according to the desired coil pattern, the printing operation of forming resin paste layers 23*a* and 23*b* (FIGS. 5A and 5B), a conductive paste layer 25 (FIGS. 6A and 6B), a ferrite paste layer 26 (FIGS. 7A and 7B), and a ferrite paste layer 27 (FIGS. 8A and 8B) is repeated a particular number of times. Lastly, the ferrite paste is applied by printing a particular number of times to form a ferrite paste layer for an outer layer; as a result, a multilayer body block, which is an assembly of elements, is obtained on the substrate.

Next, while the multilayer body block is still placed on the substrate, the respective layers are pressure-bonded, and the multilayer body block is cooled. After cooling, the metal plate and then the PET film are separated from the multilayer body block. This multilayer body block is cut by using a dicer or the like to obtain individual elements.

The obtained element is subjected to a barrel process to round the corners of the element. The barrel process may be performed on a green multilayer body or a fired multilayer body. The barrel process may be a dry process or a wet process. The barrel process may involve scrubbing the elements against each other or performing the barrel process along with media.

After the barrel process, for example, the element is fired at a temperature of about 910° C. or higher and about 930° C. or lower (i.e., from about 910° C. to about 930° C.) to obtain an element body 2 of the multilayer coil component 1. During firing, the resin paste layers 23*a* and 23*b* disappear, and a void portion is generated in the portion where the resin paste layers 23*a* and 23*b* used to be. Presence of this void portion can reduce occurrence of stress attributable to shrinkage of the ferrite paste layers and the conductive paste layers during firing. During this process, due to the shrinkage of the ferrite paste layers and the conductive paste layers, a portion of the coil that has existed between the resin paste layers 23*a* and 23*b* separates from the insulator portion 6 and forms a ridge 8. Since the coil part that has existed between the resin paste layers 23*a* and 23*b* separates from the magnetic body portion, occurrence of stress can be further reduced.

(4-2) Formation of outer electrodes

Next, an outer electrode-forming Ag paste containing Ag and glass is applied to the end surfaces of the element body 2 and baked to form base electrodes. Next, a Ni coating and a Sn coating are sequentially formed on each of the base electrodes by electrolytic plating to form outer electrodes. As a result, a multilayer coil component 1 as illustrated in FIG. 1 is obtained.

One embodiment of the present disclosure has been described heretofore, but the present embodiment is subject to various modifications.

For example, in the embodiment described above, there are two resin paste layers; alternatively, there may be three, four, or five resin paste layers.

In the embodiment described above, the void portion is formed over the entirety except for the portion where the connection with the via is established; alternatively, the void portion may be formed only in some part. For example, the void portion may be present over the range about 30% or more, preferably about 50% or more, more preferably about 70% or more, and yet more preferably about 80% or more of the length of the coil pattern of each layer. Forming the void portion over about 30% or more of the length of the coil pattern in each layer can further reduce occurrence of internal stress. Here, the "length of the coil pattern of each layer" refers to the distance from the via (or outer electrode) that connects with a coil pattern of a different layer to a via that connects with another layer.

In the description above, the magnetic body portion is formed by printing the ferrite paste; alternatively, the ferrite paste layers 22 and 27 can be formed by using ferrite sheets instead of the paste layers.

EXAMPLES

Example

Two rows of resin paste layers (Example) and one row (Comparative Example) of a resin paste layer were formed so that the width and the thickness of the coil conductor were 150 μm and 40 μm, respectively, after firing so as to form void portions and prepare multilayer coil components of Example and Comparative Example. In both Example and Comparative Example, the sample had a length (L) of 1.0 mm, a width (W) of 0.5 mm, and a height (T) of 0.5 mm.

The prepared samples of Example and Comparative Example underwent 2000 heat cycles involving a temperature of −55° C. to +125° C., the rate of change in inductance of the samples before and after the test was determined, and the result was used to evaluate the stress alleviating effect. Moreover, the DC resistance of the samples of Example and Comparative Example was measured. The results found that similar stress alleviating effects were obtained from the samples of Example and Comparative Example and that the DC resistance of the sample of Example was 5% lower than that of the sample of Comparative Example.

A multilayer coil component of the present disclosure can be used in a variety of usages including inductors.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A multilayer coil component comprising:

an element body that includes an insulator portion and a coil embedded in the insulator portion, with a groove-shaped void portion existing at a boundary between the coil and the insulator portion, the void portion extending in a length direction of the coil, the coil having a ridge in the void portion, and the ridge extending in the length direction of the coil, the coil including a first wall protrusion extending from a first edge of the coil and a second wall protrusion extending from a second edge of the coil, the first and second wall portions extending in the length direction of the coil and forming opposite surfaces of the void portion on opposite sides of the ridge along the length direction of the coil; and outer electrodes disposed on surfaces of the insulator portion and electrically connected to ends of the coil.

2. The multilayer coil component according to claim 1, wherein the void portion has a width of 80% or less of a width of a coil conductor.

3. The multilayer coil component according to claim 1, wherein the ridge has a width of from 10 μm to 100 μm.

4. The multilayer coil component according to claim 2, wherein the ridge has a width of from 10 μm to 100 μm.

5. A multilayer coil component comprising:

an element body including a plurality of layers collectively forming a structure including an insulator portion and a coil embedded in the insulator portion; and outer electrodes disposed on surfaces of the insulator portion and electrically connected to ends of the coil, wherein the coil includes a plurality of coil sections connected by vias and disposed in different layers of the plurality of layers, at least one layer of the plurality of layers includes a groove-shaped void portion existing at a boundary between a coil section of the plurality of coil sections and the insulator portion, the void portion continuously extends along about 30% or more of a length of the coil section, and the coil section comprises a main surface and a coil section axis extending along the length of the coil section, the coil section including a ridge extending radially from the coil section axis into the void portion, a width of the ridge is less than a width of the main surface of the coil section, and the ridge extends in the length direction of the coil section.

6. The multilayer coil component according to claim 5, wherein the void portion has a width of 80% or less of a width of a coil conductor.

7. The multilayer coil component according to claim 5, wherein the ridge has a width of from 10 μm to 100 μm.

8. The multilayer coil component according to claim 6, wherein the ridge has a width of from 10 μm to 100 μm.

* * * * *